Patented May 15, 1945

2,375,958

UNITED STATES PATENT OFFICE 2,375,958
CHLORINATED RUBBER
William H. Stevenson, Parlin, N. J., assignor to Hercules Powder Company, Wilmington, Del., a corporation of Delaware No Drawing. Application June 24, 1942,
Serial No. 448,305

12 Claims. (Cl. 260—772)

This invention relates to a method of preparing chlorinated rubber having exceedingly high viscosity characteristics and it relates to chlorinated rubber products obtained thereby.

Chlorinated rubber has been prepared by subjecting rubber usually in solution to the action of chlorine until substantially no more chlorine is absorbed. This procedure has resulted heretofore in material having a low or fairly low solution viscosity. Such material has been highly suitable for paints and varnishes but it could not be used in applications in which very viscous solutions were desired. In addition, films of such chlorinated rubber have been quite brittle so that it has not been possible to prepare free films sufficiently flexible to withstand normal handling in the uses of such films.

In accordance with this invention, chlorinated rubber having a very high solution viscosity and characterized by flexibility and toughness in the form of free films is obtained by a process of preparation in which there are correlated a number of closely controlled reaction factors. It has been found that a certain interrelation of these factors brings about the formation of chlorinated rubber having a viscosity and a free film flexibility considerably increased in comparison with past products.

In accordance with this invention, it has been found that the viscosity of a rubber which is to be chlorinated must be at least 10 centipoises as measured by a standard solution method in which the viscosity of a solution of 1% of the rubber in carbon tetrachloride is measured at 25° C. Rubber is usually purified, milled, or otherwise treated before use and may be so treated in the present case. However, such processing leads to a product having a variable and unpredictable viscosity which generally has been given no attention. The desired high viscosity chlorinated rubber according to the present invention is obtained only if the viscosity characteristic of the rubber before chlorination is above 10 centipoises.

It has further been found that the rubber should be chlorinated in solution in a substantially inert solvent in a concentration controlled to be between 0.6% and 3.5% by weight, preferably, between 1.0% and 2.5% by weight. It has further been found that it is necessary to add chlorine to the rubber and react the chlorine with the rubber at a rate such that, for at least a short period of time during the early stages of chlorination, the chlorine absorbed by the rubber is above 0.5 pound of chlorine per pound of rubber per hour. The chlorination is continued until the combined chlorine content of the rubber is above at least about 60% or until chlorination is substantially complete, whereupon the chlorinated rubber is promptly recovered from its solution, washed and dried.

The chlorinated rubber so obtained is characterized by a solution viscosity of at least about 7,000 centipoises. Usually, the viscosity is between about 15,000 centipoises and about 40,000 centipoises but it may be as high as about $2 \times 10^6$ centipoises. The chlorinated rubber is also characterized by high flexibility values in the form of free films. Thus, when digested rubber is chlorinated, in accordance with this invention, it is characterized by a Schopper fold value in excess of about 100 when in the form of an unmodified free film .002" thick.

The examples following will serve to illustrate the preparation of chlorinated rubber in accordance with this invention. In the examples all parts will be by weight unless otherwise specified.

Example 1

A solution was prepared by dissolving 110 pounds of thick crepe rubber in sufficient pure carbon tetrachloride to yield a solution containing 1.3% of rubber by weight. This solution had a viscosity of 4500 centipoises at 25° C. The rubber itself had a viscosity characteristic of 1800 centipoises (viscosity of 1% solution at 25° C.). The 1.3% rubber solution was warmed to 60° C. and placed in a 2500 gallon glass-lined chlorination vessel equipped with an agitator. Gaseous chlorine was then bubbled into the solution while agitating the solution, the chlorine being added at a rate of 296 pounds per hour for a period of 45 minutes. At the end of 45 minutes, chlorination was continued in the same manner but at a rate of 80 pounds per hour. The addition of chlorine was continued at the latter rate until chlorination was complete, a total chlorination period of 6½ hours being required. The chlorination vessel was cooled sufficiently to hold the temperature between 60° C. and 70° C. at all times. At the completion of the chlorinating period, the resulting chlorinated rubber solution was refluxed 30 minutes to remove gaseous components and then immediately run into a large excess of moving hot water maintained at above the boiling point of carbon tetrachloride and maintained in a state of agitation with steam. The resulting precipitated chlorinated rubber was washed thoroughly with cold water, centrifuged and dried. The viscosity characteristic of the resulting product was 37,500 centipoises. The chlorine content was 67%.

In the operation in this example involving recovery of the chlorinated rubber from the chlorination solution, care was taken to flush piping connecting the chlorination vessel with the precipitation equipment with carbon tetrachloride to remove any air present. A small portion of the batch prepared in this example was pumped through pipe lines initially air-filled and held in a tank containing air for a short period before precipitation. Upon precipitation, this portion yielded a chlorinated rubber having a viscosity of 5,000 centipoises.

Example 2

Crepe rubber was digested for 2 hours in 4% aqueous sodium hydroxide at 200° C., washed and dried. The resulting rubber had a viscosity characteristic of 40 centipoises (viscosity of 1% solution). One hundred ten pounds of the digested rubber were dissolved in sufficient pure carbon tetrachloride to obtain a solution having a concentration of rubber of 1.1% by weight. The resulting solution was chlorinated using equipment, temperature and chlorination schedule as in Example 1. However, the chlorination was complete in 6 hours. The solution was then refluxed for 30 minutes. Upon recovery of the chlorinated rubber in the manner described in Example 1, a product having a viscosity of 14,840 centipoises and a chlorine content of 66.5% was obtained. The chlorinated rubber of this viscosity was obtained by precipitation immediately at the end of the reflux period which immediately followed the chlorination period. All lines were flushed with nitrogen to remove any air contained therein. A portion of the chlorinated charge was held 3 hours in the absence of air and similarly precipitated. The product obtained had a viscosity of 9,390 centipoises.

Example 3

One hundred ten pounds of digested rubber having a viscosity characteristic of 80 centipoises (1% basis), obtained by digestion of crepe rubber in 4% aqueous sodium hydroxide at 200° C. until the said viscosity characteristic was obtained, followed by washing and drying, were dissolved in carbon tetrachloride in an amount sufficient to obtain a 1.5% by weight solution. The solution had a viscosity of 150 centipoises at 25° C. The resulting solution was warmed to 60° C. and chlorinated in equipment similar to that described in Example 1 for 45 minutes at a rate of chlorine addition of 246 pounds per hour and then chlorinated at a rate of 80 pounds per hour until a total chlorination period of 6½ hours had elapsed. The temperature was held below 70° C. The chlorinated rubber solution was then refluxed for 30 minutes and the chlorinated rubber immediately precipitated in the manner described in Example 1, taking care to exclude air from the solution prior to the precipitation step. The resulting chlorinated rubber had a viscosity of 28,300 centipoises. A portion of this batch of chlorinated rubber was stored for four hours while protecting from access of air after completion of the chlorination but prior to precipitation. The product obtained upon precipitation, washing and drying of this portion had a viscosity of 16,850 centipoises. The Schopper fold flexibility of a film .002 inch thick consisting of the 28,300 centipoises chlorinated rubber was 192 folds. The Schopper flexibility of a similar film of the 16,850 centipoises material was 115 folds.

Example 4

A 2.4% solution by weight of thick crepe rubber (viscosity characteristic on 1% basis of 1800 centipoises) in neutral dry carbon tetrachloride was chlorinated in a five gallon glass-lined vessel equipped with an agitator by adding gaseous chlorine to the solution with agitation at a rate of 1.9 pounds of chlorine per hour per pound of rubber present while maintaining the temperature at 66° C. Chlorination was complete at the end of five hours. The charge was refluxed for a short period to remove excess chlorine and any hydrochloric acid gas present, and precipitated promptly without coming in contact with air at any period between the beginning of the chlorination and the precipitation step. Precipitation was carried out by running the solution of chlorinated rubber into a large excess of agitated boiling water. The precipitated material was washed and dried under partial vacuum. The viscosity of the resulting product was 600,000 centipoises. The flexibility of a .002 inch film of the unmodified chlorinated rubber by the Schopper fold method was 500 folds.

It will be seen from the examples that rubber as ordinarily obtained may be utilized. Crepe rubber or smoked sheets or other forms may be utilized although the pale crepe form is preferred since it gives the clearest, most colorless product. Where a maximum clarity and low color are desired, and where it is intended that the product be utilized in the form of free films having high flexibility and good aging properties, the rubber is digested as a first step in the preparation of chlorinated rubber according to this invention. The digestion comprises subjecting the rubber preferably in the form of thin sheets to the action of an aqueous digestion liquor at about 150° C. to about 250° C. for from about one-half hour to about eight hours, followed by removal of the digestion liquor and, preferably, followed by washing of the digested rubber with water and drying. The aqueous digestion liquor may be water alone, water containing an alkali such as sodium hydroxide, potassium hydroxide, sodium carbonate and the like up to about 5% or it may be water containing an acid such as hydrochloric acid, sulfuric acid, phosphoric acid, oxalic acid or an acid salt in a quantity up to about 5%.

It is essential to discontinue any digestion treatment applied to the rubber before the solution viscosity on the rubber has been decreased to below 10 centipoises. It has been found that digestion materially improves the flexibility of the ultimate product, especially the flexibility after a period of aging. It also appears that reduction of rubber viscosity to some extent improves the rate of chlorination and facilitates the attainment of high viscosity in the chlorinated rubber provided that the viscosity drop is limited as has been indicated. The viscosity characteristic of the digested rubber may be as high as 2,500 centipoises but preferably is between 20 centipoises and 1,000 centipoises, as too high a viscosity leads to the formation of solutions difficult to chlorinate.

The rubber which is to be chlorinated is dissolved in a solvent substantially inert to chlorine. Carbon tetrachloride is preferred as the solvent, although other solvents such as chloroform and benzene, which are only slightly affected by chlorine and which are not rendered inoperative by the chlorine, may be utilized. The concentration of the rubber in the solution must be carefully controlled to obtain the desired high viscosity product. Concentrations between 0.6% by weight and 3.5% by weight, preferably between 1.0% and 2.5% have been found suitable. It has been found that chlorination of the rubber at a concentration below 0.6%, for example, at a concentration of 0.5%, gives a product very low in viscosity. Concentrations above 3.5% do not permit chlorination of the type essential to the preparation of high viscosity products since chlorination at the necessary high rate does not take place.

The chlorine is reacted with the rubber as rapidly as is practicable. Vigorous agitation is desirable. It appears that chlorination itself causes the viscosity of the rubber derivative to drop progressively but it has been found that viscosity can be conserved if the rate of chlorination is increased. It is necessary in order to obtain the desired viscosity product to introduce chlorine and to react with the rubber at a rate of at least 0.5 pounds of the chlorine per pound of rubber per hour for at least a portion, i. e., at least 30 minutes in the early stages of chlorination. By early stages is meant any time before the chlorine content of the rubber has reached 45%. Preferably, the rate of chlorination is above 1.8 pounds per pound of rubber per hour from the beginning of chlorination through the early stages and preferably the chlorine is added as rapidly as it can be absorbed throughout the chlorination. The rate of addition of chlorine is maintained sufficiently high throughout the reaction to chlorinate the rubber to a combined chlorine content of in excess of 60% within a total chlorination period of no more than nine hours. It is in any case essential in the method according to this invention, to chlorinate the rubber within a period less than the period in which the viscosity characteristic of the product becomes less than 7,000 centipoises or below the viscosity desired.

The chlorination may be conducted at atmospheric pressure or at superatmospheric pressure and it may advantageously be conducted under a superatmospheric pressure, for example, between two pounds and 500 pounds per square inch or higher to facilitate chlorination. A pressure of two to five pounds per square inch is advantageous in excluding air and facilitating chlorination. The chlorination may be carried out at any temperature between the freezing or solidifying point and the refluxing point of the solution, in general at any temperature up to about 80° C. It has been found most desirable to chlorinate at a temperature between about 60° C. and about 75° C. The chlorination is continued until the resulting rubber chloride has a combined chlorine content between about 60% and about 71%, preferably, between about 66% and about 69%.

Certain precautions are observed in the preparation of high viscosity chlorinated rubber including avoidance of conditions known to reduce viscosity. Substantially pure solvents have been found to give most reliable results. The rubber solution to be chlorinated should contain a minimum amount of moisture. Substantial exclusion of air or oxygen is necessary during the chlorination procedure. It is desirable to blanket the solution being chlorinated and to flush pipes and vessels in which the rubber or chlorinated rubber solution is handled prior to completion of the precipitation step with carbon dioxide, nitrogen or other inert gas or to fill with an inert liquid such as carbon tetrachloride which is then displaced to exclude oxygen. Complete exclusion of oxygen from the solution during chlorination and at all times prior to the completion of the precipitation operation is highly desirable, and in all cases the solution should be treated under conditions precluding contact with sufficient oxygen to reduce the viscosity below the desired minimum. It is also desirable to precipitate or otherwise remove the chlorinated rubber from its reaction solution as soon as possible after completion of the reaction; it is essential to recover the product from solution before the viscosity drops below the desired figure or below 7,000 centipoises. Upon completion of the chlorination step, the chlorinated rubber is recovered from the reaction solution. Desirably, any free chlorine and hydogen chloride present are first removed by refluxing the solution. The chlorinated rubber is readily recovered by precipitation accomplished by mixing with an inert non-solvent miscible with the carbon tetrachloride or by mixing it with a large volume of steam, hot water, or both, after the desired chlorine content has been attained. The precipitated chlorinated rubber may then be washed with water and dried.

The chlorinated rubber in accordance with this invention is particularly useful in the form of free films which are suitable for lamination, wrapping, container windows, photographic films, and the like. Free films are sufficiently flexible and tough to withstand a normal handling required in such uses. Chlorinated rubber having a viscosity above about 15,000 centipoises is particularly applicable in free films. The flexibility characteristics are retained indefinitely where digested rubber is utilized in the preparation.

The chlorinated rubber is characterized by a Schopper fold test value of in excess of 100 double folds as measured on free unmodified films .002 inch thick. For chlorinated rubber viscosity in excess of 15,000 centipoises, the Schopper fold value will be from about 150 to about 400 and may, in some cases, be as high as 600.

Free films of the chlorinated rubber may consist solely of the chlorinated rubber or they may be modified with plasticizers and coloring matter. In most cases, plasticizers do not greatly increase the flexibility of the chlorinated rubber as measured by the Schopper fold test and, in fact, in a great many cases plasticizers lower the flexibility. However, plasticizers are useful in some cases in order to obtain a softer, limper feel in the sheeting or film, and to decrease stiffness. A quantity of plasticizer up to about 25% of the chlorinated rubber may be used. Suitable plasticizers for the purpose are butyl stearate, diamyl phthalate, dibutyl phthalate, refined mineral oil in admixture with dibutyl phthalate or diamyl phthalate, castor oil, linseed oil, heat-treated tung oil, tricresyl phosphate, chlorinated diphenyl, and the like. Typical examples of sheeting and the fold value of the sheeting are given in Table I. The sheeting in each case was prepared by dissolving the non-volatile materials in toluene in the quantities indicated and casting films which upon drying in a water-saturated atmosphere were .002 inch thick.

Table I

|  | Example | | | | | |
| --- | --- | --- | --- | --- | --- | --- |
|  | A | B | C | D | E | F |
| Chlorinated rubber 20,000 cps. | 20 | 20 | 20 |  |  |  |
| Chlorinated rubber 7,000 cps. |  |  |  | 20 | 20 | 20 |
| Butyl stearate |  | 1.75 |  |  | 1.75 |  |
| Diamyl phthalate |  |  | 0.9 |  |  | 1.8 |
| Refined mineral oil (Nujol) |  |  | 1.3 |  |  | 1.8 |
| Toluol | 80 | 78.25 | 77.8 | 80 | 78.25 | 76.4 |
| Schopper double folds | 192 | 116 | 231 | 175 | 110 | 183 |

Free films of chlorinated rubber of the high viscosity of the present invention are water-proof and, in addition, they are sufficiently moisture vapor-proof in thickness above about .003 inch for use in packaging foodstuffs without modification of the film. However, where extreme moisture vapor-proofness is desired, a wax, for example, paraffin, Japan wax, or the like, may be incorporated in the film in a quantity between about 1% and about 10% by weight. Where wax is incorporated, it is desirable to dry the film at a temperature above the melting point of the wax.

Free films suitable for lamination and wrapping sheeting will ordinarily have a thickness between about .0005 and about .003 inch. For a stiffer sheeting, higher film thicknesses up to about .010 inch are suitable.

Where there is reference in the specification and claims of this application to the viscosity or viscosity characteristic of rubber in centipoises (cps.), it is meant that the viscosity characteristics of the rubber are such that a solution of 1% concentration by weight in carbon tetrachloride has the designated viscosity at 25° C.

Where there is reference in the specification and claims of this application to the viscosity or viscosity characteristic of chlorinated rubber, it is meant that the chlorinated rubber has viscosity characteristics such that a 20% solution by weight in toluol has the designated viscosity at 25° C. Wherein the specification and claims of this application, reference is made to a Schopper fold test or Schopper fold value, it is meant the number of double folds required to break a uniform film of chlorinated rubber .002 inch thick and 0.394 inch wide, the folds being applied under a tension of 1,000 grams in a Schopper fold tester, model for paper up to 0.25 mm. thick, Serial 1583, at a temperature of 70°±1° F. In applying the Schopper fold measurement to measure the inherent flexibility of chlorinated rubber, the material is dissolved in toluene in a concentration of 25% and films having deviations no greater than .002 inch thickness after drying are cast therefrom. The films are dried in a confined space, in the presence of water vapor, containing a sufficient concentration of toluene to insure freedom from blushing or other inequalities of the surface. Strips are cut from the film with a sharp knife or razor blade to insure freedom from rough or torn edges.

What I claim and desire to protect by Letters Patent is:

1. A process for the preparation of chlorinated rubber having a viscosity characteristic above about 7,000 centipoises (measured in a 20% solution in toluol at 25° C.) which comprises chlorinating a solution of rubber in a concentration between about 0.6% and about 3.5% by weight in a rubber solvent substantially unaffected by chlorine, the rubber having a viscosity characteristic above 10 centipoises (measured in a 1% solution in carbon tetrachloride at 25° C.), and the rate of reaction between the rubber and the chlorine being above 0.5 pound of chlorine absorbed per pound of rubber per hour for a period of at least 30 minutes before the chlorine content of the rubber has reached 45%, continuing chlorination until the resulting rubber chloride has a combined chlorine content above at least about 60%, the overall reaction rate being sufficient to permit formation of chlorinated rubber of at least 7,000 centipoises viscosity (measured in a 20% solution in toluol at 25° C.), and recovering chlorinated rubber of at least the said viscosity characteristic from the solution.

2. A process for the preparation of chlorinated rubber having a viscosity characteristic above about 15,000 centipoises (measured in a 20% solution in toluol at 25° C.) which comprises chlorinating a solution of rubber in a concentration between about 1.0% and about 2.5% by weight in a rubber solvent substantially unaffected by chlorine, the viscosity characteristic of the rubber being above 20 centipoises (measured in a 1% solution in carbon tetrachloride at 25° C.), and the rate of reaction between the rubber and the chlorine being above 1.8 pounds of chlorine absorbed per pound of rubber per hour for a period of at least 30 minutes before the chlorine content of the rubber has reached 45%, continuing chlorination until the resulting rubber chloride has a combined chlorine content between about 60% and about 71%, the overall reaction rate being sufficient to permit the formation of chlorinated rubber of at least 15,000 centipoises viscosity (measured in a 20% solution in toluol at 25° C.), and recovering chlorinated rubber of at least the said viscosity characteristic from the solution.

3. A process for the preparation of chlorinated rubber having a viscosity characteristic above about 7,000 centipoises (measured in a 20% solution in toluol at 25° C.) which comprises chlorinating a solution of rubber in a concentration between about 0.6% and about 3.5% by weight in carbon tetrachloride, the said rubber having a viscosity characteristic above 10 centipoises (measured in a 1% solution in carbon tetrachloride at 25° C.) and the rate of reaction between the rubber and the chlorine being above 0.5 pound of chlorine absorbed per pound of rubber per hour for a period of at least 30 minutes before the chlorine content of the rubber has reached 45%, continuing chlorination until the resulting rubber chloride has a combined chlorine content between about 60% and about 71%, the overall reaction rate being sufficient to permit formation of chlorinated rubber of at least 7,000 centipoises viscosity (measured in a 20% solution in toluol at 25° C.), and recovering chlorinated rubber of at least the said viscosity characteristic from the solution.

4. A process for the preparation of chlorinated rubber having a viscosity characteristic above about 15,000 centipoises (measured in a 20% solution in toluol at 25° C.) which comprises chlorinating a solution of rubber in a concentration between about 1.0% and about 2.5% by weight in carbon tetrachloride, the viscosity characteristic of the rubber being above 20 centipoises (measured in a 1% solution in carbon tetrachloride at 25° C.), and the rate of reaction between the rubber and the chlorine being above 1.8 pounds of chlorine absorbed per pound of rubber per hour for a period of at least 30 minutes before the chlorine content of the rubber has reached 45%, continuing chlorination until the resulting rubber chloride has a combined chlorine content between about 60% and about 71%, the overall reaction rate being sufficient to permit the formation of chlorinated rubber of at least 15,000 centipoises viscosity (measured in a 20% solution in toluol at 25° C.), and recovering chlorinated rubber of at least the said viscosity characteristic from the solution.

5. A process for the preparation of chlorinated rubber having a viscosity characteristic above about 7,000 centipoises (measured in a 20% solution in toluol at 25° C.) which comprises chlorinating a solution of rubber in a concentration between about 0.6% and about 3.5% by weight in carbon tetrachloride, the rubber having a viscosity characteristic above 10 centipoises (measured in a 1% solution in carbon tetrachloride at 25° C.), and the rate of reaction between the rubber and the chlorine being above 0.5 pound of chlorine absorbed per pound of rubber per hour for a period of at least 30 minutes before the chlorine content of the rubber has reached 45%, maintaining the addition of chlorine at a rate sufficient to chlorinate the rubber to a combined chlorine content of in excess of 60% within a total chlorination period of less than nine hours, and precipitating chlorinated rubber of at least the said viscosity characteristic from the solution.

6. A process for the preparation of chlorinated rubber having a viscosity characteristic above about 15,000 centipoises (measured in a 20% solution in toluol at 25° C.) which comprises chlorinating a solution of rubber in a concentration between about 1.0% and about 2.5% by weight in carbon tetrachloride, the viscosity characteristic of the rubber being above 20 centipoises (measured in a 1% solution in carbon tetrachloride at 25° C.), and the rate of reaction between the rubber and the chlorine being above 1.8 pounds of chlorine absorbed per pound of rubber per hour for a period of at least 30 minutes before the chlorine content of the rubber has reached 45%, maintaining the addition of chlorine at a rate sufficient to chlorinate the rubber to a combined chlorine content of in excess of 60% within a total chlorination period of less than 9 hours, and precipitating chlorinated rubber of at least the said viscosity characteristic from the solution.

7. A process for the preparation of chlorinated rubber having a viscosity characteristic above about 7,000 centipoises (measured in a 20% solution in toluol at 25° C.) which comprises chlorinating a solution of rubber in a concentration between about 0.6% and about 3.5% by weight in carbon tetrachloride, the said rubber having a viscosity characteristic above 10 centipoises (measured in a 1% solution in carbon tetrachloride at 25° C.) and the rate of reaction between the rubber and the chlorine being above 0.5 pound of chlorine absorbed per pound of rubber per hour for a period of at least 30 minutes before the chlorine content of the rubber has reached 45%, continuing chlorination until the resulting rubber chloride has a combined chlorine content between about 60% and about 71%, the overall reaction rate being sufficient to permit formation of chlorinated rubber of at least 7,000 centipoises viscosity (measured in a 20% solution in toluol at 25° C.), refluxing the solution of chlorinated rubber until free chlorine and hydrogen chloride are substantially eliminated, and recovering chlorinated rubber of at least the said viscosity characteristic from the solution.

8. A process for the preparation of chlorinated rubber having a viscosity characteristic above about 15,000 centipoises (measured in a 20% solution in toluol at 25° C.) which comprises chlorinating a solution of rubber in concentration between about 1.0% and about 2.5% by weight in carbon tetrachloride, the viscosity characteristic of the rubber being above 20 centipoises (measured in a 1% solution in carbon tetrachloride at 25° C.), and the rate of reaction between the rubber and the chlorine being above 1.8 pounds of chlorine absorbed per pound of rubber per hour for a period of at least 30 minutes before the chlorine content of the rubber has reached 45%, continuing chlorination until the resulting rubber chloride has a combined chlorine content between about 60% and about 71%, the overall reaction rate being sufficient to permit the formation of chlorinated rubber of at least 15,000 centipoises viscosity (measured in a 20% solution in toluol at 25° C.), refluxing the solution of chlorinated rubber until free chlorine and hydrogen chloride are substantially eliminated, and recovering chlorinated rubber of at least the said viscosity characteristic from the solution.

9. A process for the preparation of chlorinated rubber having a viscosity characteristic above 7,000 centipoises (measured in a 20% solution in toluol at 25° C.) which comprises digesting rubber at a temperature between about 150° C. and about 250° C. for a period of at least about 30 minutes in an aqueous digestion liquid selected from the group consisting of water alone, water containing an alkali, water containing an acid, and water containing an acid salt, which digestion liquid contains less than 5% dissolved material and serves in the digestion to decrease the viscosity of the rubber; discontinuing the digestion before the viscosity characteristic of the rubber has been decreased to 10 centipoises (measured in a 1% solution in carbon tetrachloride at 25° C.); removing the digestion liquid from the rubber; dissolving the digested rubber in a rubber solvent substantially unaffected by chlorine in a concentration between about 0.6% and about 3.5% by weight of the solution; chlorinating the rubber in said solution, the rate of reaction between the rubber and the chlorine being above 0.5 pound of chlorine absorbed per pound of rubber per hour for a period of at least 30 minutes before the chlorine content of the rubber has reached 45%; continuing chlorination until the resulting rubber chloride has a combined chlorine content between about 60% and about 71%, the overall reaction rate being sufficient to permit formation of chlorinated rubber of at least 7,000 centipoises viscosity (measured in a 20% solution in toluol at 25° C.); and recovering chlorinated rubber of at least the said viscosity characteristic from the solution.

10. A process for the preparation of chlorinated rubber having a viscosity characteristic above 15,000 centipoises (measured in a 20% solution in toluol at 25° C.) which comprises digesting rubber at a temperature between about 150° C. and about 250° C. for a period of at least about 30 minutes in an aqueous digestion liquid selected from the group consisting of water alone, water containing an alkali, water containing an acid, and water containing an acid salt, which digestion liquid contains less than 5% dissolved material and serves in the digestion to decrease the viscosity of the rubber; discontinuing the digestion before the viscosity characteristic of the rubber has been decreased to 20 centipoises (measured in a 1% solution in carbon tetrachloride at 25° C.); removing the digestion liquid from the rubber; dissolving the digested rubber in a rubber solvent substantially unaffected by chlorine in a concentration between about 1.0% and about 2.5% by weight of the solution; chlorinating the rubber in said solution, the rate of reaction between the rubber and the chlorine being above 1.8 pounds of chlorine absorbed per pound of rubber per hour for a period of at least 30 minutes before the chlorine content of the rubber has reached 45%; continuing chlorination until the resulting rubber chloride has a combined chlorine content between about 60% and about 71%, the overall reaction rate being sufficient to permit formation of chlorinated rubber of at least 15,000 centipoises viscosity (measured in a 20% solution in toluol at 25° C.); and recovering chlorinated rubber of at least the said viscosity characteristic from the solution.

11. A process for the preparation of chlorinated rubber having a viscosity characteristic above 7,000 centipoises (measured in a 20% solution in toluol at 25° C.) which comprises digesting rubber at a temperature between about 150° C. and about 250° C. for a period of at least about 30 minutes in an aqueous digestion liquid selected from the group consisting of water alone, water containing an alkali, water containing an acid, and water containing an acid salt, which digestion liquid contains less than 5% dissolved material and serves in the digestion to decrease the viscosity of the rubber; discontinuing the digestion before the viscosity characteristic of the rubber has been decreased to 10 centipoises (measured in a 1% solution in carbon tetrachloride at 25° C.); removing the digestion liquid from the rubber; dissolving the digested rubber in carbon tetrachloride in a concentration between about 0.6% and about 3.5% by weight of the solution; chlorinating the rubber in said solution, the rate of reaction between the rubber and the chlorine being above 0.5 pound of chlorine absorbed per pound of rubber per hour for a period of at least 30 minutes before the chlorine content of the rubber has reached 45%; continuing chlorination until the resulting rubber chloride has a combined chlorine content between about 66% and about 69%, the overall reaction rate being sufficient to permit formation of chlorinated rubber of at least 7,000 centipoises viscosity (measured in a 20% solution in toluol at 25° C.), the chlorinated rubber solution being kept from contact with sufficient oxygen to cause the viscosity characteristic of the chlorinated rubber to become less than 7,000 centipoises (measured in a 20% solution in toluol at 25° C.); and recovering chlorinated rubber of at least the said viscosity characteristic from the solution.

12. A process for the preparation of chlorinated rubber having a viscosity characteristic above 15,000 centipoises (measured in a 20% solution in toluol at 25° C.) which comprises digesting rubber at a temperature between about 150° C. and about 250° C. for a period of at least about 30 minutes in an aqueous digestion liquid selected from the group consisting of water alone, water containing an alkali, water containing an acid, and water containing an acid salt, which digestion liquid contains less than 5% dissolved material and serves in the digestion to decrease the viscosity of the rubber; discontinuing the digestion before the viscosity characteristic of the rubber has been decreased to 20 centipoises (measured in a 1% solution in carbon tetrachloride at 25° C.); removing the digestion liquid from the rubber; dissolving the digested rubber in carbon tetrachloride in a concentration between about 1.0% and about 2.5% by weight of the solution; chlorinating the rubber in said solution, the rate of reaction between the rubber and the chlorine being above 1.8 pounds of chlorine absorbed per pound of rubber per hour for a period of at least 30 minutes before the chlorine content of the rubber has reached 45%; continuing chlorination until the resulting rubber chloride has a combined chlorine content between about 66% and about 69%, the overall reaction rate being sufficient to permit formation of chlorinated rubber of at least 15,000 centipoises viscosity (measured in a 20% solution in toluol at 25° C.), the chlorinated rubber solution being kept from contact with sufficient oxygen to cause the viscosity characteristic of the chlorinated rubber to become less than 15,000 centipoises (measured in a 20% solution in toluol at 25° C.); and recovering chlorinated rubber of at least the said viscosity characteristic from the solution.

WILLIAM H. STEVENSON.